United States Patent
Campisano et al.

(10) Patent No.: US 7,050,113 B2
(45) Date of Patent: May 23, 2006

(54) DIGITAL VIDEO DATA SCALER AND METHOD

(75) Inventors: Francesco A. Campisano, Owego, NY (US); David Allen Hrusecky, Johnson City, NY (US); Bryan Jay Lloyd, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 634 days.

(21) Appl. No.: 10/108,110

(22) Filed: Mar. 26, 2002

(65) Prior Publication Data

US 2003/0184675 A1 Oct. 2, 2003

(51) Int. Cl.
  *H04N 1/387* (2006.01)
  *H04N 9/74* (2006.01)
(52) U.S. Cl. .............. 348/581; 348/589; 348/598; 348/584; 348/600; 382/284; 382/298; 345/630; 345/629
(58) Field of Classification Search ............... 348/581, 348/584, 578, 589, 598, 600, 715; 345/629, 345/630, 531, 634, 619; 382/284, 298, 299
See application file for complete search history.

(56) References Cited

U.S. PATENT DOCUMENTS

| 5,581,304 A |   | 12/1996 | Wang .................. 348/558 |
| 5,999,220 A |   | 12/1999 | Washino ............... 348/441 |
| 6,311,204 B1 | * | 10/2001 | Mills .................. 718/100 |
| 6,327,000 B1 | * | 12/2001 | Auld et al. ........... 348/441 |
| 6,377,713 B1 | * | 4/2002 | Vuong ................. 382/299 |
| 6,388,711 B1 | * | 5/2002 | Han et al. ............ 348/441 |
| 6,700,588 B1 | * | 3/2004 | MacInnis et al. ...... 345/629 |

FOREIGN PATENT DOCUMENTS

JP           04345388 A     5/1991

* cited by examiner

*Primary Examiner*—John Miller
*Assistant Examiner*—Jean W. Désir
(74) *Attorney, Agent, or Firm*—William H. Steinberg, Esq.; Kevin P. Radigan, Esq.; Heslin Rothenberg Farley & Mesiti, P.C.

(57) ABSTRACT

A digital video stream is digitally scaled to properly display on a device having a horizontal to vertical aspect ratio different than the source aspect ratio leaving a blank area on the device. Graphic data is digitally scaled separately to extend partially or completely into and therefore use the blank area. A compositing blender digitally combines the two prior to a display encoder which produces analog signals for driving the display device.

24 Claims, 3 Drawing Sheets

DIGITAL VIDEO DATA SCALER AND METHOD

TECHNICAL FIELD

The invention relates to digital video processing techniques and apparatus. In particular the invention relates to scaling digital video data after decoding to accommodate display on display devices having arbitrary horizontal to vertical aspect ratios. Even more particularly the invention relates to scaling and combining arbitrarily scaled decoded digital video frames with other digital or graphical data to make better use of portions of a display device which would otherwise be unused by the arbitrarily scaled decoded digital video frames.

BACKGROUND OF THE INVENTION

Video and still picture data is generated in a variety of aspect ratios. Conventional NTSC televison uses a 4:3 horizontal to vertical frame ratio. High Definition Television (HDTV) uses a 16:9 ratio. Other ratios are also commonly used by motion pictures. Still pictures have many formats depending on the equipment, cameras etc. used to generate, including square, portrait, landscape, and many others. The MPEG Video Standard ISO/IEC 13818-2 of November 1994, for example lists among others, a 711:483 pixel display size and a 702:575 display size.

When a frame having one aspect ratio is displayed on a display device having a different aspect ratio, some type of accommodation must be made.

One type of accommodation known in the art involves stretching e.g. magnifying or demagnifying either the horizontal or vertical dimension to make the generated frame completely fill the display device area. For example a 4:3 source may be stretched or scaled up horizontally to completely fill a 16×9 HDTV display. It is well known that such stretching causes the image to be distorted so that for example circles will appear as ellipses. Faces take on an unnatural appearance.

The aspect ratio differences may also be accommodated by keeping the source aspect ratio fixed and utilizing only a part of the display device area. Typically one dimension is fully utilized and the other dimension will have blank areas. If the source is centered on the display device, then there will be blank areas at the top and bottom of the screen, known as letterbox, or else there will be blank areas at the left and right sides. Wang in U.S. Pat. No. 5,581,304 describes a method of detecting a 4×3 letterbox frame having blank top and bottom areas. If this frame is to be displayed on a 16×9 display device, the blank areas may be detected and removed to restore the aspect ratio to 16×9 for proper display on the 16×9 device. Viewers having a 4×3 display device will see the full letterbox display including blank areas.

Another accommodation method known in the art involves display of a 16×9 source on a 4×3 display device. The 16×9 source is cropped to remove some of the source area. Typically the center area is kept, however any portion may be selected depending on which part is more important. This method is referred to as pan-scan because the most important part may change over time producing a horizontal panning effect as the image is shifted horizontally on the 4×3 display device.

Washino in U.S. Pat. No. 5,999,220 describes a system and method for converting video data between the various formats just described. Haruki in Japanese patent JP04345388A abstract describes aspect ratio conversion in a wide screen televison receiver.

As noted some of the methods leave blank areas on the display device when displaying certain aspect ratio source data. It is believed that a better utilization of these blank areas would be a desirable feature contributing to advancement in the art.

OBJECTS AND SUMMARY OF THE INVENTION

It is therefore a principal object of the present invention to enhance the digital video art by providing a system with enhanced display capabilities.

It is another object to provide such a system wherein enhanced operational capabilities are possible.

It is a further object to provide such a system which can be produced in an inexpensive manner and is adapted for volume production.

It is yet another object of the invention to provide a method for enhanced display of digital video data which can be accomplished in a facile manner.

These and other objects are attained in accordance with one embodiment of the invention wherein there is provided an apparatus for scaling video data, comprising, first horizontal scaler for scaling a frame of a decoded digital video stream by a first scale factor, second horizontal scaler for scaling digital graphic data by a second scale factor different from the first scale factor, compositing blender for digitally combining the scaled video stream from the first horizontal scaler with the scaled graphic data from the second horizontal scaler, and digital display encoder attached to the compositing blender for converting the digital composited blend to analog form for display on a display device, and wherein the scaled graphic data is scaled to extend beyond the scaled video stream on the display device.

In accordance with another embodiment of the invention there is provided a method of scaling video data, comprising the steps of, providing a decoded digital video stream, providing digital graphic data, scaling a frame of the decoded digital video stream by a first scale factor, scaling the digital graphic data by a second scale factor different from the first scale factor, combining in a compositing blender, the scaled video stream with the scaled digital graphic data, and encoding the digital composited blend to analog form for display on a display device, and wherein the scaled digital graphic data is scaled to extend beyond the scaled video stream.

BEST MODE FOR CARRYING OUT THE INVENTION

For a better understanding of the present invention, together with other and further objects, advantages and capabilities thereof, reference is made to the following disclosure and the appended claims in connection with the above-described drawings.

Figure 1:
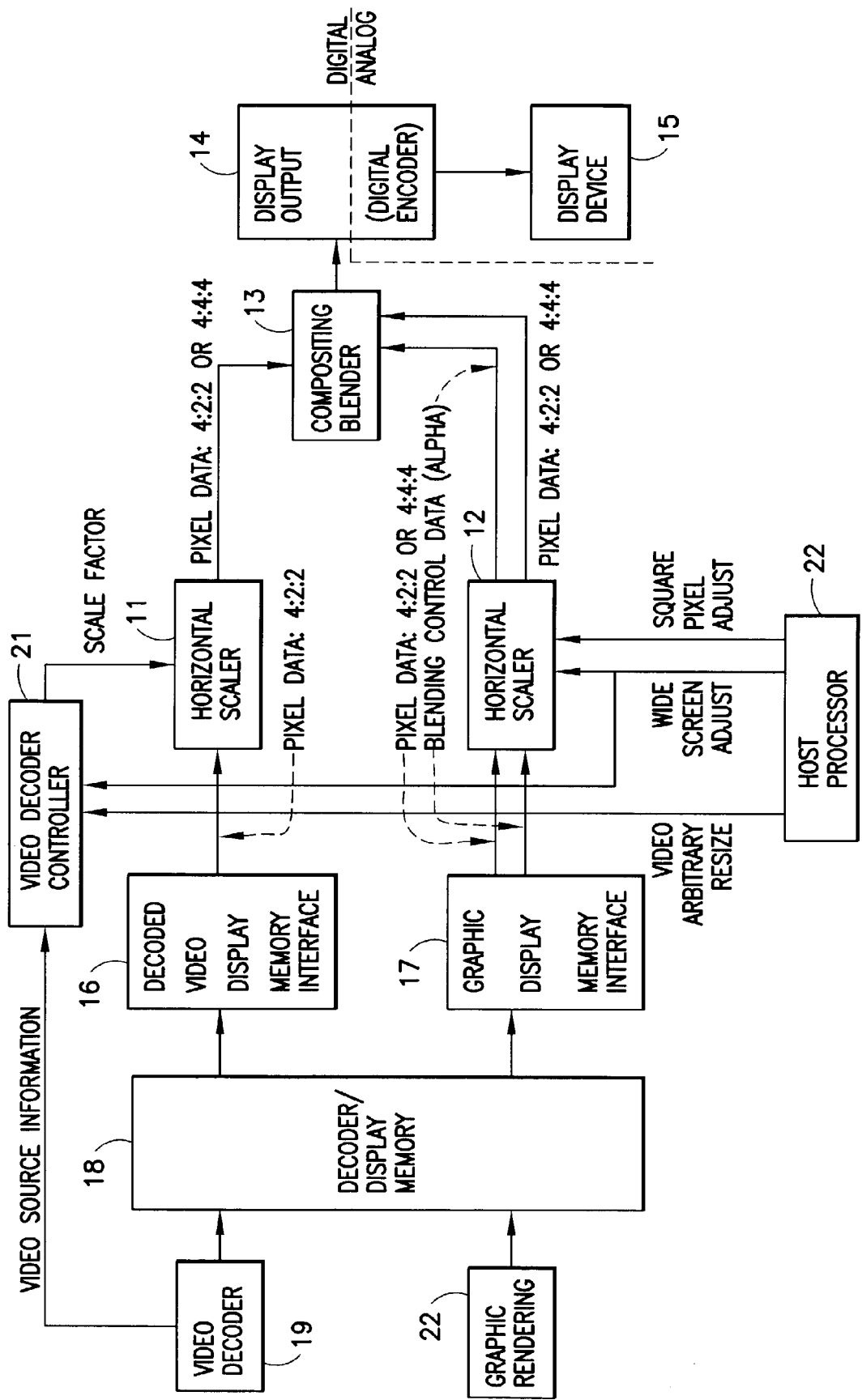
FIG. 1 shows components comprising the apparatus for scaling video data.

In FIG. 1 there is shown an apparatus for scaling video data in accordance with the present invention. Horizontal scaler 11 operates on decoded digital video data. The decoded digital video data may be retrieved from a memory 18 by memory interface 16 and delivered as an input to horizontal scaler 11. The decoded digital video data is decoded in video decoder 19 before being stored in memory 18. For example, video decoder 19 may be decoding an MPEG-2 encoded digital video data stream. A frame of this stream may be stored in memory 18 in accordance with the previously identified MPEG-2 standard. Other digital video encoding standards or techniques may also be used, in which case a corresponding video decoder 19 would be used. The decoded digital video stream entering horizontal scaler 11, for example may be pixel data in a YUV, 4:2:2 format as is well known in the art. Other formats such as digital RGB may also be used.

Horizontal scaler operates on the decoded digital video stream under control of a scale factor as shown in FIG. 1 and sends an output stream of scaled pixel data to compositing blender 13. Any type of horizontal scaler known in the art may be used at 11. One example shown in FIG. 2 will be described below.

A second horizontal scaler 12 receives digital graphic data from memory interface 17 which retrieves the data from memory 18. Memory 18 may be any type of memory device known in the art for storing digital data whether configured as a single memory holding both the decoded digital video stream and the digital graphic data or alternatively as two or more separately configured memories. The digital graphic data may be provided to memory 18 by any source including a graphic rendering device 22. The digital graphic data may be a still or moving image video of any digital decoded image standard including a second decoded MPEG-2 video stream.

Second horizontal scaler 12 operates on the digital graphic data under control of a second scale factor which may be set by a wide screen adjust signal or square pixel adjust signal, each provided by host processor 22 which is optional. Host processor 22 may also set the scale factor for horizontal scaler 11 either directly or via video decoder controller 21 as shown in FIG. 1.

Figure 3:
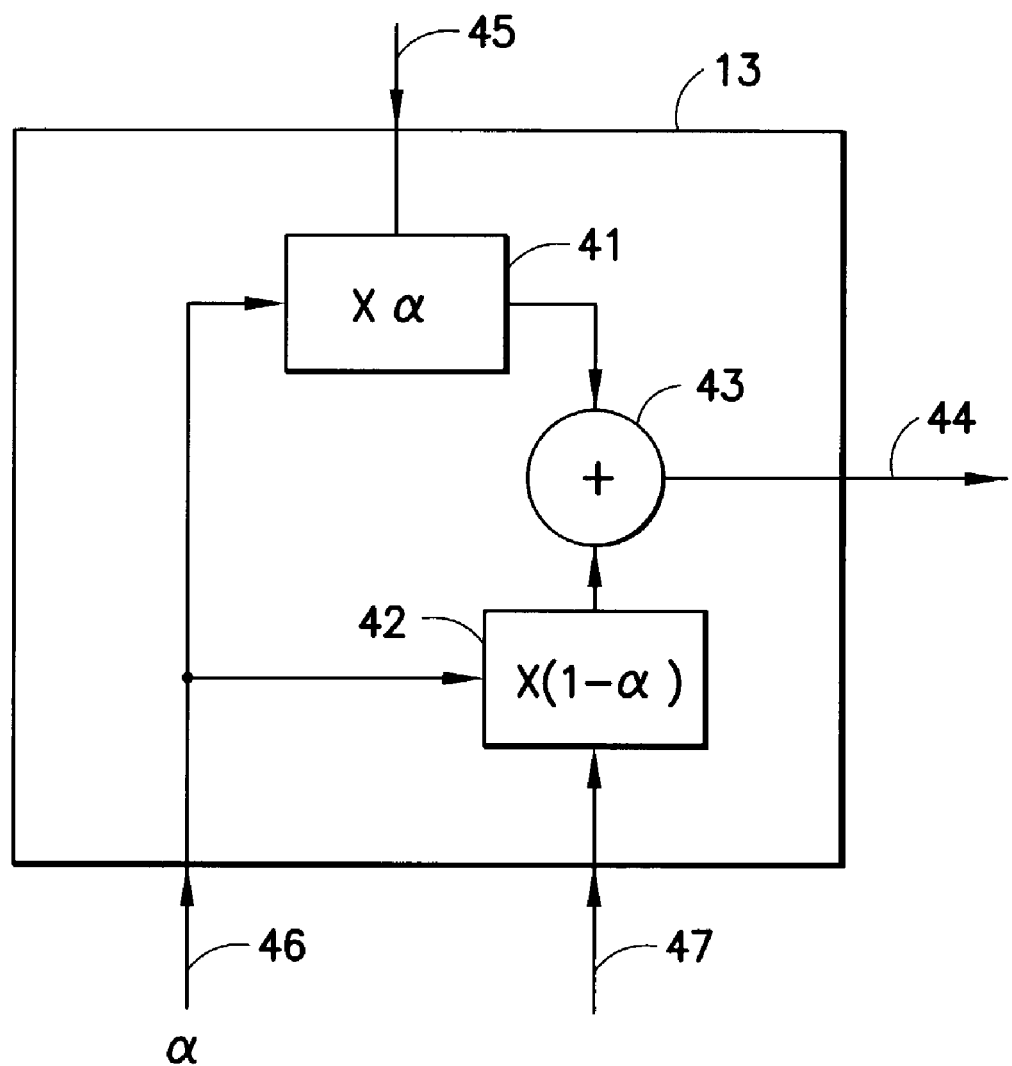
FIG. 3 is a block diagram of a compositing blender.

Outputs of first 11 and second 12 horizontal scalers which may be pixel data in 4:2:2 or 4:4:4 formats or any other type of outputs are combined in compositing blender 13. FIG. 3, described below, shows one type of compositing blender known as a digital weighted summer. Signal alpha ($\alpha$) 46 controls the relative weight applied to the scaled video stream 45 and scaled graphic data 47 in compositing blender 13. Alpha may be set by data retrieved as part of the graphic data as shown in FIG. 1 or alternatively set by host processor 22.

Digital display encoder 14 converts the composited blend from digital to analog format for display on display device 15. Display encoder may, for example, convert three digital values e.g. Y, U, and V or R, G, and B into three analog voltages. Synchronizing signals may also be provided to display device 15 as required by the particular display device.

The present invention makes use of what would otherwise be blank area on display device 15 which may be any type of display device including a cathode ray tube (CRT), liquid crystal display, gaseous panel, and projection display. As explained above, blank areas may be produced when source video data from memory interface 16, with a first aspect ratio is scaled to be displayed on a display device having a second, different aspect ratio. Graphic data can be positioned and scaled differently in horizontal scaler 12 to appear partially or fully in the blank areas. For example host processor 22 can appropriately set different scale factors for horizontal scalers 11 and 12 and weighting factor alpha. Those of ordinary skill in the art will recognize that horizontal scalers 11 and 12 may be constructed separately, as separate digital circuitry whether combined on a single semiconductor chip or not. They may also be constructed as a single shared or multiplexed scaler provided that different scale factors are applied to the digital video stream and the graphic data. Comparable alternatives may be constructed in software running on a processor or microprocessor without departing from the scope of the present invention.

Figure 2:
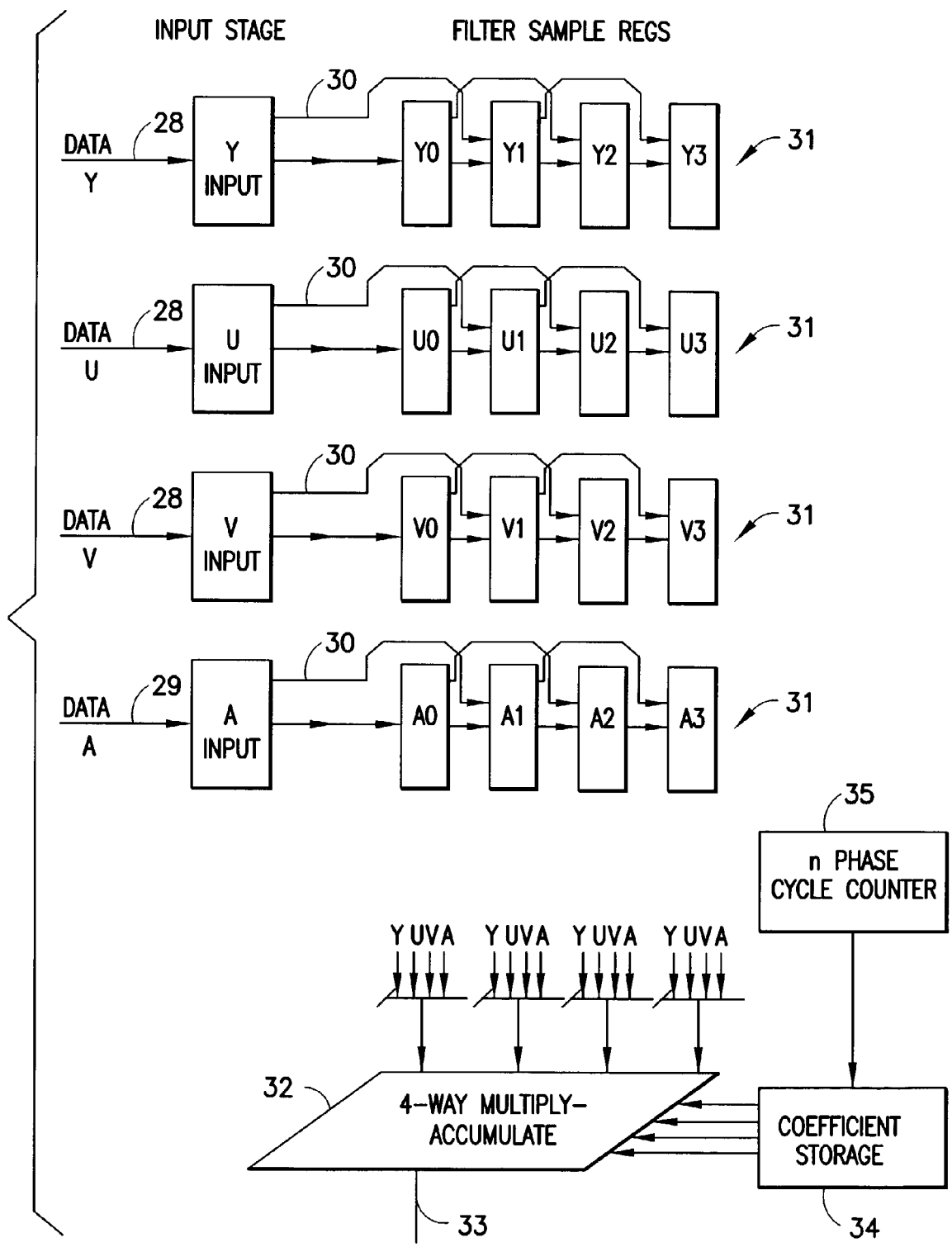
FIG. 2 is a block diagram of a horizontal scaler.

In FIG. 2 there is shown one embodiment of a horizontal scaler. Input pixel data 28 in Y, U, V, format is stored sequentially in registers 31 along with weighting signal alpha 29 described below. The pixel data may also be R, G, B encoded data. As data 28 for each new pixel arrives, data for the previous pixel is shifted right into the next register e.g. data in register Y0 shifts into register Y1 as the new Y data is stored in Y0. For some scaling the data may be shifted right by two steps as noted by the upper path 30 in FIG. 2. Although four registers are shown in FIG. 2 for each data input, those skilled in the art will recognize that any number of registers may be used depending on the precision of shift required.

The stored Y, U, V, and alpha data is combined in 4-way multiply accumulator 32 to form a horizontally shifted and filtered pixel. For example Y0 is multiplied by a coefficient, Y1 is multiplied by a second coefficient, Y2 by a third coefficient, and Y3 by a fourth coefficient. Coefficient storage 34 clocked by n phase cycle counter 35 provides the appropriate coefficients which will differ depending on the amount of shift desired and the filtering type. The four multiplied results described above for Y data are added together in 32 and corrected for overflow/underflow if needed before passing out of the horizontal shifter on output 33.

U, V, and alpha data are each likewise multiplied, added, checked and presented to output 33.

The storage, multiply by a coefficient, and add function just described may be viewed as a finite impulse response (FIR) type of filter operation on each of the data inputs Y, U, V, and alpha.

In FIG. 3 there is shown one embodiment of compositing blender 13 having scaled video stream 45 and scaled graphic data 47 inputs coming from first and second horizontal scalers respectively. Weighting signal alpha 46, is also provided as a digital value with any level of precision limited only by the number of digital bits provided to define alpha. Typically alpha will have a digital value corresponding to an analog value between zero and one, or zero to 100 percent. Digital multiplier 41 produces the digital product of each pixel component of scaled video stream 45 e.g. Y, U, and V, or R, G, and B and alpha. In a similar way digital multiplier 42 forms the product of the digital equivalent of one minus alpha or 100 percent minus alpha with each pixel component of scaled graphic data 47. The multiplied components are digitally added in adder 43, component by component e.g. Y to Y, U to U and the like. The digital composited blend 44 is output to digital display encoder 14.

While there have been shown and described what are at present considered the preferred embodiments of the invention, it will be obvious to those skilled in the art that various changes and modifications may be made therein without departing from the scope of the invention as defined by the appended claims.

What is claimed is:

1. An apparatus for scaling video data, comprising:
first horizontal scaler for scaling a frame of a decoded digital video stream by a first scale factor, said first scale factor resulting in a scaled video stream with a first horizontal to vertical aspect ratio;
second horizontal scaler for scaling digital graphic data by a second scale factor different from said first scale factor, said second scale factor resulting in scaled graphic data with a second horizontal to vertical aspect ratio, wherein said second horizontal to vertical aspect ratio is different from said first horizontal to vertical aspect ratio;
compositing blender for digitally combining the scaled video stream from said first horizontal scaler with the scaled graphic data from said second horizontal scaler; and
digital display encoder attached to said compositing blender for converting the digital composited blend to analog form for display on a display device having said second horizontal to vertical aspect ratio; and wherein
when displayed, said scaled video stream in said first aspect ratio utilizes fully one dimension of said display device, with blank areas in the other dimension of said display device, and said scaled graphic data in said second aspect ratio is scaled to extend beyond said scaled video stream on said display device to fill the blank areas on said display device.

2. The apparatus of claim 1, further comprising a first memory for storing a frame of said digital video stream.

3. The apparatus of claim 2, further comprising a digital video decoder for decoding a digital video stream and placing said frame of said decoded digital video stream in said memory.

4. The apparatus of claim 1, further comprising a second memory for storing said graphic data.

5. The apparatus of claim 2, further comprising a decoded video display memory interface attached to said first memory and said first horizontal scaler, for retrieving said frame of said digital video stream from said first memory and providing said frame to said horizontal scaler as a decoded digital video stream.

6. The apparatus of claim 4, further comprising a graphic display memory interface attached to said memory and said second horizontal scaler, for retrieving said graphic data from said second memory and providing said graphic data to said second horizontal scaler as a digital video stream.

7. The apparatus of claim 3, further comprising a video decoder controller attached to said video decoder and said first horizontal scaler and a host processor attached to said video decoder controller and said second horizontal scaler for setting said first and second scale factors.

8. The apparatus of claim 1, wherein said first or second horizontal scaler comprises a four way multiply-accumulator.

9. The apparatus of claim 1, wherein said compositing blender comprises a digital weighted summer.

10. The apparatus of claim 1, further comprising a display device attached to said digital display encoder, for displaying said combined scaled video stream and scaled graphic data to a user.

11. The apparatus of claim 1, wherein said first aspect ratio is a 4:3 horizontal to vertical aspect ratio, and said second aspect ratio is a 16:9 horizontal to vertical aspect ratio.

12. The apparatus of claim 11, wherein a host processor is coupled to said first and said second horizontal scalers for setting said first and said second scale factors, said setting being via at least one of a wide screen adjust signal and a square pixel adjust signal.

13. A method of scaling video data, comprising the steps of:
providing a decoded digital video stream;
providing digital graphic data;
scaling a frame of said decoded digital video stream by a first scale factor, said first scale factor resulting in a scaled video stream with a first horizontal to vertical aspect ratio;
scaling said digital graphic data by a second scale, said second scale factor resulting in scaled graphic data with a second horizontal to vertical aspect ratio, wherein said second horizontal to vertical aspect ratio is different from said first horizontal to vertical aspect ratio;
combining in a compositing blender, said the scaled video stream with the scaled digital graphic data; and
encoding the digital composited blend to analog form for display on a display device having said second horizontal to vertical aspect ratio; and wherein
when displayed, said scaled video stream in said first aspect ratio utilizes fully one dimension of said display device, with blank areas in the other dimension of said display device, and said scaled digital graphic data in said second aspect ratio is scaled to extend beyond said scaled video stream to fill the blank areas on said display device.

14. The method of claim 13, further comprising the step of storing said frame of said decoded digital video stream in a first memory.

15. The method of claim 14, further comprising the step of decoding a digital video stream and sending a frame of said decoded digital video stream to said first memory.

16. The method of claim 13, further comprising the step of storing said digital graphic data in a second memory.

17. The method of claim 14, further comprising the step of retrieving said frame of said digital video stream from said first memory as said decoded digital video stream.

18. The method of claim 16, further comprising the step of retrieving said digital graphic from said second memory.

19. The method of claim 15, further comprising the step of setting said first and second scale factors with a host processor.

20. The method of claim 13, wherein said scaling comprises a four way multiply-accumulate process.

21. The method of claim 13, wherein said digital video stream is an MPEG-2 encoded digital video stream.

22. The method of claim 13, further comprising the step of displaying said digital composited blend on a display device.

23. The method of claim 13, wherein said first aspect ratio is a 4:3 horizontal to vertical aspect ratio, and said second aspect ratio is a 16:9 horizontal to vertical aspect ratio.

24. The method of claim 23, further comprising employing a host processor to set said first scale factor and said second scale factor, said setting being via at least one of a wide screen adjust signal and a square pixel adjust signal.

* * * * *